(12) United States Patent
Balocca

(10) Patent No.: US 6,371,155 B1
(45) Date of Patent: Apr. 16, 2002

(54) FAUCET LOCK

(76) Inventor: Cory A. Balocca, 315 E. Seward, Burlingame, KS (US) 66413

( * ) Notice: Subject to any disclaimer, the term of this patent is extended or adjusted under 35 U.S.C. 154(b) by 0 days.

(21) Appl. No.: 09/632,144

(22) Filed: Aug. 3, 2000

(51) Int. Cl.[7] ............................ F16K 35/10; F16K 35/14
(52) U.S. Cl. ............................ 137/377; 137/382; 251/90
(58) Field of Search ................................. 137/382, 377; 251/90

(56) References Cited

U.S. PATENT DOCUMENTS

| | | | |
|---|---|---|---|
| 2,838,064 A | 6/1958 | Schieberl | 137/382 |
| 3,940,196 A | 2/1976 | Ketchel | 312/237 |
| 4,301,828 A | 11/1981 | Martin, Jr. | 137/381 |
| 4,457,445 A | * 7/1984 | Hanks et al. | 220/214 |
| 5,033,280 A | * 7/1991 | Johnson | 70/232 |
| 5,070,554 A | 12/1991 | Bertoli | 4/630 |
| 5,263,853 A | 11/1993 | Pall | 137/382 |
| 5,588,316 A | 12/1996 | Jones | 137/382 |
| 5,590,682 A | 1/1997 | Fischer | 137/382 |

* cited by examiner

Primary Examiner—A. Michael Chambers
(74) Attorney, Agent, or Firm—Hovey Williams LLP

(57) ABSTRACT

A safety device and method to selectively prevent the operation of a faucet handle by unsophisticated individuals are disclosed. More specifically, a water faucet safety device including a faucet handle cover which expands and contracts to enclose the handle, wherein the handle includes a locking mechanism that selectively fixes the cover to the handle and prevents cover expansion, and a restraining bar that cooperates with the cover to prevent rotation of the faucet handle. The restraining bar may be anchored to the faucet spigot or other nearby fixed structures. The device may be configured for use with a single handle or a dual handle faucet. With respect to the dual handle configuration, the device includes a pair of independently operable faucet handle covers sharing a common restraining bar. Thus, when both covers have been separately fixed to the respective faucet handles using the independent locking mechanisms, operation of both handles is prevented.

12 Claims, 2 Drawing Sheets

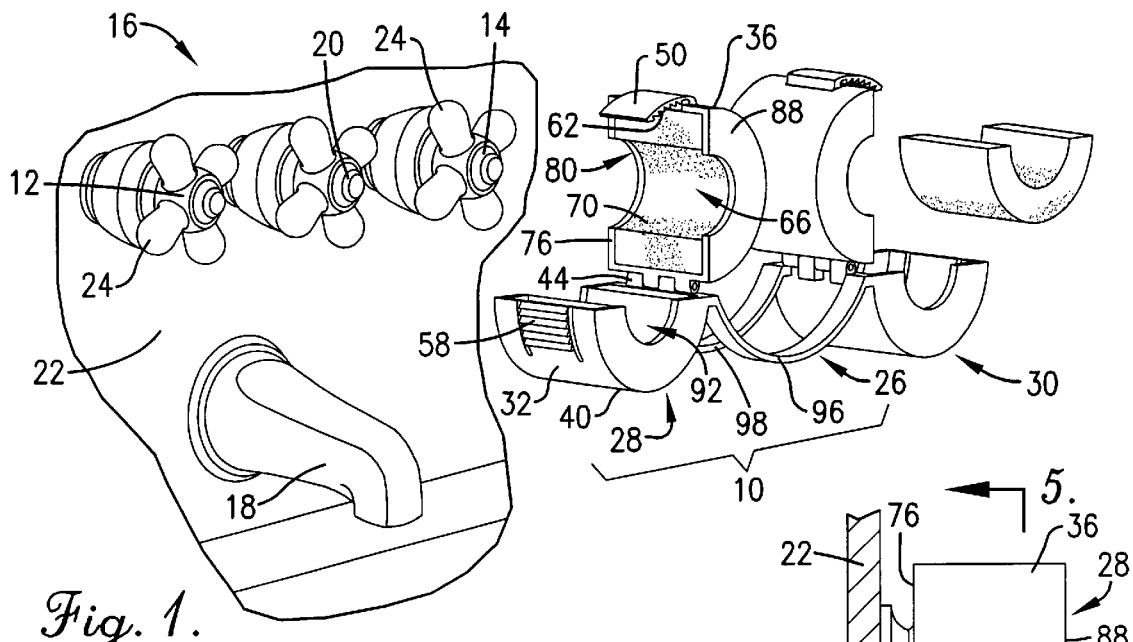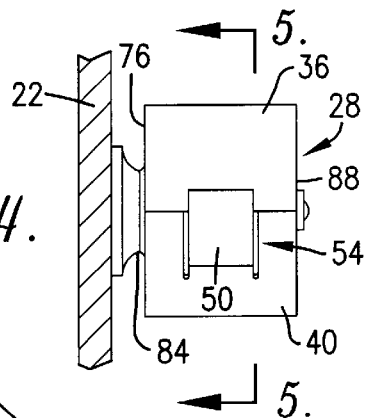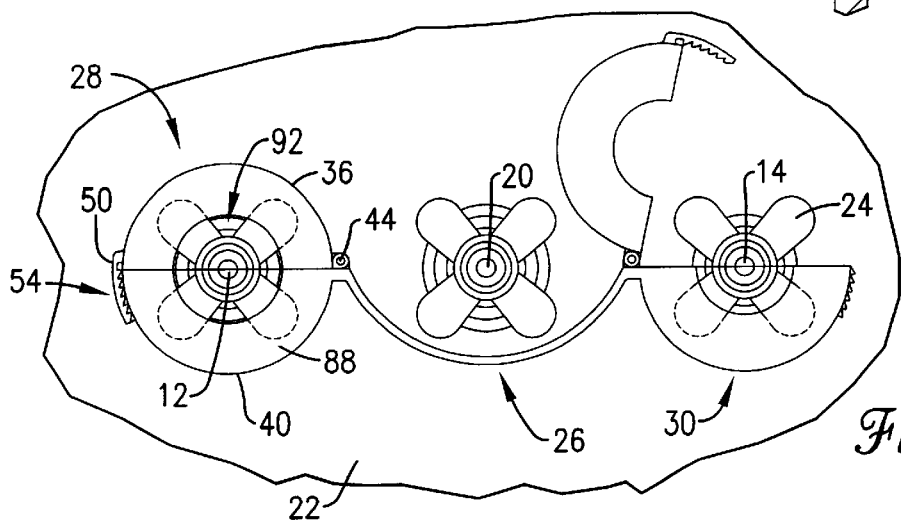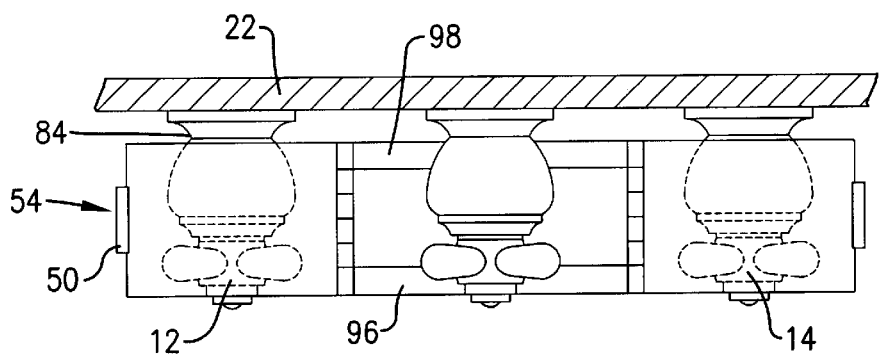

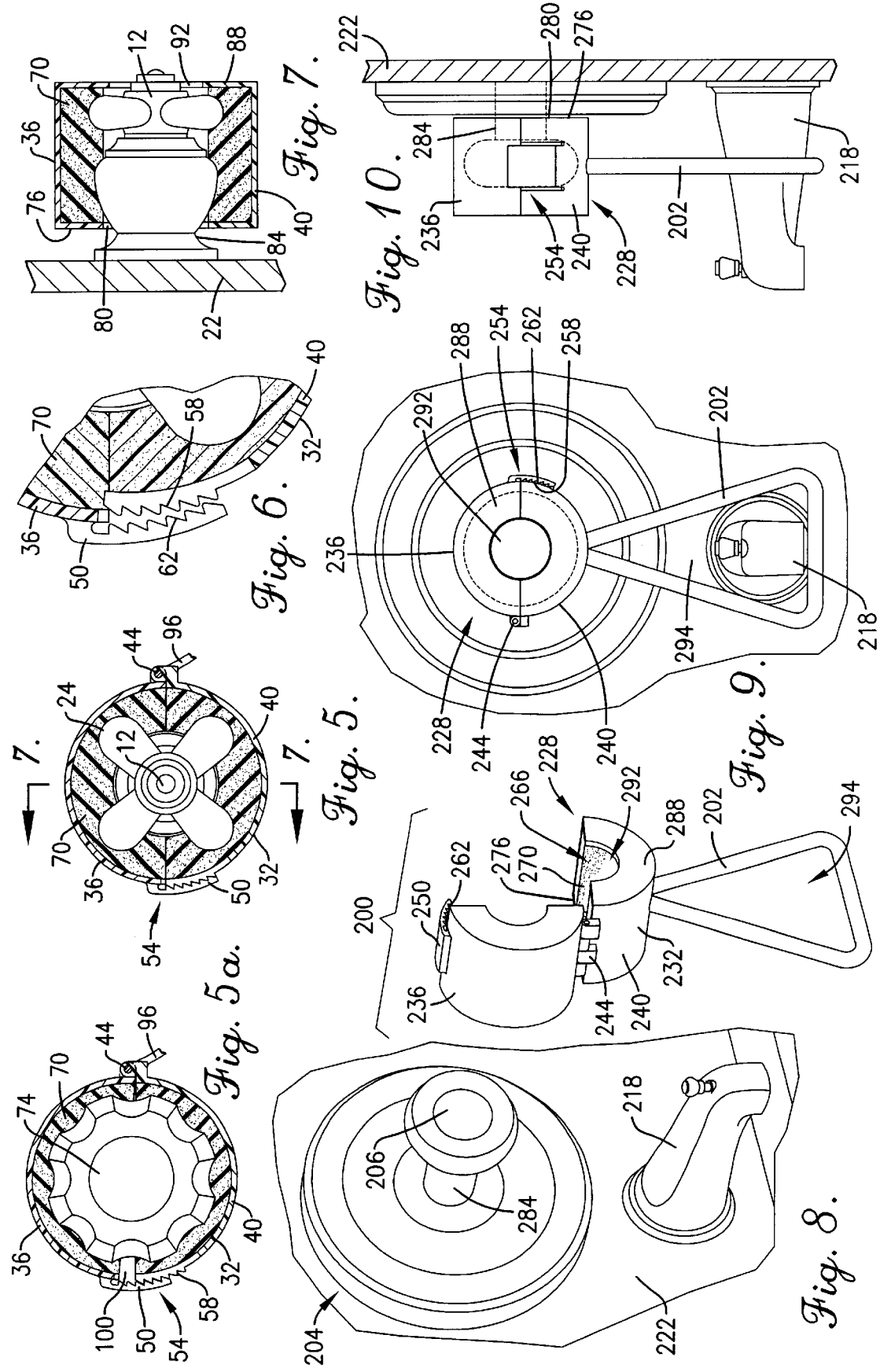

FAUCET LOCK

TECHNICAL FIELD

This invention relates to the field of safety devices, and more particularly, to safety devices for preventing the operation of water faucet handles by unsophisticated individuals, including young children.

BACKGROUND

On occasions, unsophisticated children have unsupervised access to water faucets. Too often these children attempt to play with the water faucets and are injured by scalding hot water or from jerking away from cold water. These injuries can be minimized by the use of a faucet safety device that covers the faucet handle and prevents operation of the faucet by those too immature to understand the consequences. At the same time, the device should be easy to install and remove to facilitate and encourage use by supervising adults.

SUMMARY OF THE INVENTION

The present invention provides a simple, inexpensive handle cover that prevents operation of the faucet handle when installed. With respect to one aspect of the present invention, the safety device includes a restraining bar removably attachable to a fixed structure and an expandable faucet handle cover, fixed relative to the restraining bar. The cover presents a handle-receiving cavity that varies in size as the cover is expanded and contracted. It also includes a pair of elongated, opposed, separable toothed surfaces that move lengthwise relative to one another as the cover is expanded and contracted, with the teeth of the surfaces being interlockable to prevent expansion of the cover. The cover encloses the faucet handle to restrict operation of the handle independent of the cover, which is fixed by the restraining bar. Thus, an adult can easily install and remove the mechanism, but it prevents an endangered child from operating the faucet handle. The inventive features of the device are useful for both dual handle faucets and single handle faucets.

The present invention also concerns a faucet safety device for selectively restricting operation of a pair of faucet handles, where operation of either faucet handle involves movement of the handle relative to the other faucet handle. The device includes a restraining bar and a pair of independently expandable faucet handle covers that are fixed relative to the restraining bar. Each cover also presents a handle-receiving cavity that varies in size as the cover is expanded and contracted. The dual faucet safety device provides an independent locking mechanism for each of the faucet handle covers, with each mechanism being operable to selectively prevent expansion of each of said covers. The independent locking mechanisms facilitate use on various size faucet handles, particularly on handles that are larger than average. The restraining bar between the two covers prevents movement of the covers and therefore operation of either handle.

The present invention also concerns a faucet safety device where the faucet handle cover is operable be fixed to the faucet handle and the projecting, rigid restraining bar is dimensioned and configured to extend at least partly around a fixed structure. The cover and the bar thereby cooperate to prevent operational movement of the handle. The device is easily installed in a multitude of environments to prevent movement or rotation of the cover and therefore operation of the handle.

The present invention further concerns a simplified method of preventing rotation of the hot water and the cold water handles of a faucet. The first faucet handle cover is fixed to the hot water handle in such a manner that rotation of the hot water handle would require rotation of the first cover. The second faucet handle cover is independently fixed to the cold water handle in such a manner that rotation of the cold water handle would require rotation of the second cover. Wherein the first and second handle covers are fixed relative to one another, neither cover or the associated handle can be rotated and operation of the faucet is prevented. This method allows for improved installation on handles of various sizes.

A method particularly adapted to use with the single faucet safety device directs the positioning of an elongated, substantially rigid restraining bar around structure that is fixed relative to the handle during handle operation. Typically this might be the faucet spigot or another handle. The user then fixes the projecting handle cover to the handle in such a maimer that rotation of the handle would require rotation of the cover. The restraining bar prevents rotation of the cover, thus preventing operation of the handle.

Other aspects and advantages of the present invention will be apparent from the following detailed description of the preferred embodiments and the accompanying drawing figures.

BRIEF DESCRIPTION OF THE DRAWINGS

Preferred embodiments of the invention are described in detail below with reference to the attached drawing figures, wherein:

FIG. 1 is an isometric view of a dual faucet safety device incorporating the principles of the present invention;

FIG. 2 is a front view illustrating the dual faucet safety device installed on the hot water faucet handle and receiving but not yet fixing the cold water handle;

FIG. 3 is a top view of the dual faucet safety device installed on the faucet;

FIG. 4 is a side view of the dual faucet safety device installed on the faucet;

FIG. 5a is a partial cross-sectional front view of a faucet handle cover installed on a large faucet handle;

FIG. 5 is a partial cross-sectional front view of a faucet handle cover installed on a faucet handle;

FIG. 6 is an enlarged, fragmentary, cross-sectional front view of a locking mechanism;

FIG. 7 is a cross-sectional side view of faucet handle cover installed on a faucet handle;

FIG. 8 is an isometric view of a single faucet safety device incorporating the principles of the present invention;

FIG. 9 is a front view of a single faucet safety device installed on a single handle faucet; and FIG. 10 is a side view of a single faucet safety device installed on a single handle faucet.

DETAILED DESCRIPTION OF THE PREFERRED EMBODIMENTS

FIG. 1 illustrates a dual faucet safety device 10 in a position for installation on a hot water handle 12 and a cold water handle 14 of a water faucet 16. Naturally, the size, shape and composition of water faucet 16 may vary, but generally it will include structures positionally fixed in relative location, such as one or two handles 12, 14 and a spigot 18. Water faucets may be found in many areas of the home, typically including the kitchen, the laundry room and the bathroom. In the bathroom tub or shower, a water faucet 16 may include a shower head and a shower selector handle 20. The water faucet handles 12, 14 generally project out from a wall 22, counter or other flat surface. While the faucet handles 12, 14 in this description are depicted as having four radially projecting knobs 24, it is recognized and within the spirit of this invention that faucet handles have many different shapes, such as squat cylindrical disks, tulip-shaped or knurled knobs. Typically, the user operates the faucet 16 by rotating the handle 12, 14 relative to the wall 22.

The faucet safety device 10, illustrated in FIG. 1, includes a restraining bar 26 and first and second expandable faucet handle covers 28, 30. Since the cover 30 is structurally identical to and a mirror image of the cover 28, detailed discussion of the cover 30 will be omitted in the sake of brevity. While other shapes are within the spirit and scope of the invention (e.g. spheroid, football-shaped, or rectangular with generally flat sides), the cover 28 is illustrated as cylindrically shaped with an outer cylindrical face 32. The cover 28 also comprises a first portion 36 and a second portion 40 pivotly connected by a hinge 44 for allowing expansion and contraction of cover 28. A tab 50 projects from the outer cylindrical face 32. A pair of elongated, opposed toothed surfaces provide a locking mechanism 54, with a first toothed surface 58 existing on the outer cylindrical face 32 and the tab 50 presenting an opposed toothed surface 62. The tab 50 is depicted as projecting from the first portion 36 with the first toothed surface 58 on the second portion 40, but it should be clear that the tab 50 may originate from a multitude of locations, including locations on the second portion 40, with a length sufficient to allow the locking mechanism 54 to engage.

The cover 28 forms a handle-receiving cavity 66 partially filled by compressible material 70 (preferably extruded closed cell foam rubber). The compressible material 70 grips the handle 12 as depicted in FIG. 5, and is retained in the cover 28. The material 70 will deform to accommodate various shape and sizes of handles.

The hinge 44 is a standard design with hollow tubes in line and a central rod around which the tubes rotate. Other pivoting connections are also included in the spirit of the invention including rotating pins in retaining cavities or rings on a central shaft.

The hinged relationship between the first portion 36 and the second portion 40 contributes to the expandibility of the cover 28 to improve the ability of the cavity 66 to accommodate an oversized handle 74 as illustrated in FIG. 5a. Additionally, the cover 28 itself may be pliable, allowing substantial expansion of size. In an envisioned embodiment, the cover would be constructed of polyethylene terephthalate (PET) with sufficient malleability to form a cylinder with overlapping cylindrical sides and a cylindrical diameter varying from less than 2 inches to more than 5 inches. In some embodiments, with a highly flexible material, the hinge 44 is not required, and the first portion 36 and the second portion 40 become a unitary construction (not shown). The device 10 could be constructed from a variety of material including PET, molded plastic, brass or stainless steel.

The locking mechanism 54 also enhances the expandibility of the cover 28. The interlockable first toothed surface 58 engages the opposed toothed surface 62 when the user presses the tab 50 onto the outer cylindrical face 32 while contracting the cover 28 about the handle 12. The locking mechanism 54 thus fixes the cover 28 to the handle 12. To remove the cover 28, the user further compresses the cover 28, or at least the second portion 40, and lifts the tab 50, disengaging the locking mechanism 54 (see FIG. 6).

Within the spirit of the invention, the locking mechanism 54 can be embodied in forms other than interlockable toothed surfaces. The mechanism would, for example, include a pin and sockets arrangement, where a plethora of sockets are presented on the outer cylindrical face. A further example of a suitable mechanism is a series of hook and eye latching arrangements.

The cover 28 also includes an end wall 76 near the wall 22. The end wall 76 has an opening 80 which allows passage of a handle stem 84 from the handle 28 to the wall 22. The end wall 72 further improves the ability of the cover 28 to grip the handle 12 and prevent undesired removal of the cover 28 by an unsophisticated individual. A front wall 88 may be provided on the cover 28 opposite the end wall 76, with the same or a different sized opening 90, to improve installation flexibility and fit.

In FIG. 1, the restraining bar 26 is shown as a pair of rigid, arcuate strips 96, 98 with an open center area therebetween. The arcuate shape avoids the potentially obstructing shower selector handle 20 which may be present. The restraining bar 26 is of sufficient rigidity to prevent substantial rotation of the cover 28 relative to the bar 26. As should be obvious to those skilled in the art, the restraining bar 26 can present a variety of different shapes within the spirit of this invention (e. g. single or multiple rods in a V-shaped configuration; a solid rigid arm, or an I-beam element). The restraining bar 26 need not be constructed of the same material as the cover. A suitable bar could be formed from a wide variety of material including PET, hard plastic or stainless steel, or a combination of components, where a stiff reenforcing element is encased in a more esthetic soft plastic jacket. Fabrication of the device is also adaptable, and might include one piece injection molding of the cover and the restraining bar. Alternatively, production of individual portions and subsequent assembly might be preferred.

In use, the faucet safety device 10 allows for simple, easy operation to promote effective use. With the faucet safety device 10 in an expanded configuration (see FIG. 1), the user positions the faucet safety device 10 such that the faucet handle 12 is received in the cavity 66 of the cover 28, while the faucet handle 14 is similarly received in the cover 30. The handle stem 84 is located within the semicircular portion of the opening 80 defined in either half of the end wall 76. The cover 30 is similarly oriented relative to handle 14. The user then closes the first portion 36 and contracts the cover 28 about the handle 12 to substantially enclose the handle 12 (see FIG. 2). Pressing the tab 50 onto the toothed surface 58 of the outer face 32, the user interlocks the locking mechanism 54 thus fixing the cover 28 to the handle 12, preventing operation of the handle 12 independent of the cover 28 (see FIG. 4). The cover 30 is fixed about the handle 14 in an identical fashion, such that operation of the handle 14 independent of the cover 30 is prevented (see FIG. 3). Joined by the restraining bar 26, neither cover 28, 30 can be rotated and operation of either handle 12, 14 is thus prevented. The device 10 cannot be inappropriately pulled off the handle 12 by a child or unsophisticated user because the end wall 76 encases the handle 12, as shown in FIG. 7. Additionally, the compressible material 70 grips the handle to prevent forcible removal when the cover 28 is clamped in place (see FIG. 5).

As should be obvious to those with skill in the art, it is not essential that the cover 28, 30 be completely closed when fixed to the handle 12, 14. If an oversized handle 74 is encountered, the device 10 can be installed and will function even if the cover 28 presents a gap or open section 100, as shown in FIG. 5a.

FIG. 8 illustrates a single faucet safety device 200, which presents many of the same features as the dual faucet safety device 10 described above. Similar to the dual faucet, a single faucet 204 typically projects from a wall 222 and operates by rotation of a single faucet handle 206 relative to the wall 224. The single faucet handle 206 is used primarily in showers and sinks, but can be found in other applications as well. It should be understood that the single faucet safety device 200 could be used on a dual handle faucet 16 to prevent the operation of a single handle, such as hot water faucet handle 12.

The single faucet safety device 200 includes a restraining bar 226 and an expandable faucet handle cover 228, depicted in FIGS. 9 and 10. The cover 228 is cylindrical in shape and consequently presents an outer cylindrical face 232. The cover 228 presents a first portion 236 and a second portion 240 pivotly connected by a hinge 244 for allowing expansion and contraction of the cover 228. Projecting from the outer cylindrical face 232 is a tab 250.

A locking mechanism 254 exists, with a first toothed surface 258 on the outer cylindrical face 232 and a opposed toothed surface 262 on the tab 250. The hinged relationship between the first portion 236 and the second portion 240 contribute to the expandibility of the cover 228. The cover 228 forms a handle-receiving cavity 266 partially filled with a compressible material 270 (preferably extruded closed cell foam rubber). The material 270 will deform to accommodate various shapes and sizes of handles and to improve the ability of the cavity 266 to accommodate an oversized handle 74.

The locking mechanism 254 also enhances the ability to accommodate oversized handles. The interlockable first toothed surface 258 engages the opposed toothed surface 262 when the user presses the tab 250 onto the outer cylindrical face 232 while contracting the cover 228 about the handle 206. The locking mechanism 254 thus fixes the cover 228 to the handle 206. To remove the cover 228, the user further compresses the cover 228, or at least the second portion 240, and lifts the tab 250, disengaging the locking mechanism 254.

In a preferred embodiment, a rear end wall 276 is provided, with an opening 280 being defined centrally in the end wall 276 to simplify placement around handle stem 284 while improving retention of the handle 206 within the cover 228. A front wall 288 with an opening 292 may also be present.

In the single faucet safety device 200, the restraining bar 226 forms an open continuous loop 294 that can be easily placed around a nearby fixed structure, such as the faucet spigot 218, as shown in FIG. 9. Other fixed structures displaced perpendicular to the wall 222, such as the shower selector handle 20 illustrated in FIG. 1 could also be used to fix restraining bar 226.

In a preferred embodiment, the restraining bar 226 is generally triangular in shape to facilitate installation while still preventing movement when installed. Other restraining bar configurations within the scope of the invention are possible, including a bar with an adjustable loop strap, for example. The loop 294 is dimensioned to fit standard bath fixtures, and different sized loops might be manufactured for different faucets. The device is preferentially manufactured in a process where a substantial portion of the cover and the restraining bar are formed as an integral unit. The restraining bar projects from a central location on the outer surface of the cover to improve strength and stability. Alternatively, the cover and the restraining bar can be assembled from individually formed components to form a rigid faucet safety device in accordance with the present invention.

The use of the single faucet safety device 200 is simple. The loop 294 of the restraining bar 226 is placed over a structure that is positionally fixed relative to the handle 206, such as the water spigot 218. The expandable faucet handle cover 228 is then positioned such that the handle 206 is in the handle-receiving cavity 266 and the handle stem 284 rests in the opening 280. The cover 228 is contracted by pivoting the first portion 236 to enclose the handle 206 and by further compressing the outer cylindrical face 232. The user then presses the tab 250 onto the toothed surface 258 on the outer cylindrical face 232, engaging the locking mechanism 254 (see FIG. 10). Thus, since rotation of the cover 228 is prohibited by the restraining bar 226, and movement of the handle 206 independent of the cover 228 is constrained, operation of the handle 206 is prevented. To remove the cover 228, the second portion 240 is compressed and the locking mechanism 254 is disengaged. The user then expands the cover 228 and removes the handle 206 from the cavity 266.

While it should be obvious that the dual faucet safety device 10 is most conveniently used when both a hot water handle 12 and a cold water handle 14 are present, a single faucet safety device 200 could also be used if the user desired only to prevent the operation the hot water handle. Further, while not optimal, the dual faucet safety device 10 could be used to prevent operation of a single faucet handle 206 by enclosing any positionally fixed structure, such as the water spigot 218, in the second expandable faucet handle cover 30.

The preferred forms of the invention described above are to be used as illustration only, and should not be utilized in a limiting sense in interpreting the scope of the present invention. Obvious modifications to the exemplary embodiments, as herein above set forth, could be readily made by those skilled in the art without departing from the spirit of the present invention.

The inventor(s) hereby states their intent to rely on the doctrine of equivalents to determine and assess the reasonably fair scope of the present invention as pertains to any apparatus not materially departing from but outside the literal scope of the invention as set forth in the following claims:

I claim:

1. A faucet safety device for selectively restricting operation of a faucet handle, wherein operation of the faucet handle involves movement of the handle relative to a fixed structure, said device comprising:

a restraining bar removably attachable to the fixed structure; and an expandable faucet handle cover being fixed relative to the restraining bar and presenting a handle-receiving cavity that varies in size as the cover is expanded and contracted, said cover including a pair of elongated, opposed, separable toothed surfaces that move lengthwise relative to one another as the cover is expanded and contracted, with the teeth of the surfaces being interlockable to prevent expansion of the cover, said toothed surfaces each presenting a plurality of teeth so that expansion of the cover is preventable in a variety of handle-receiving cavity sizes.

2. A faucet safety device as claimed in claim 1, resilient, compressible material being located in the cavity and being adapted to grippingly engage the handle and the cover.

3. A faucet safety device as claimed in claim 1, said faucet handle cover including a first portion, a second portion, and a hinge pivotly connecting the first and the second portions.

4. A faucet safety device as claimed in claim 1, said cavity presenting a length and a width, said cover including an end wall extending at least substantially across the cavity width adjacent one end thereof, and said end wall presenting an opening.

5. A faucet safety device as claimed in claim 1, said cover presenting an outer cylindrical face and including a tab, said tab projecting from said outer face presenting an inside face positionable in an opposed relationship with said outer face, and each of said toothed surfaces being defined on a respective one of the faces.

6. A faucet safety device as claimed in claim 5, said cover including an end wall at one end of the cylindrical face, and said end wall presenting an opening.

7. A faucet safely device for selectively restricting operation of a pair of faucet handles, wherein operation of either faucet handle involves movement of the handle relative to the other faucet handle, the device comprising:

a restraining bar; and a pair of independently expandable faucet handle covers each being fixed relative to the restraining bar and presenting a handle-receiving cavity that varies in size as the cover is expanded and contracted, each of said covers including a locking mechanism operable to selectively prevent expansion of each of said covers, each locking mechanism being operable independently of the other locking mechanism so that each cover can be fixed to the respective one of the handles without requiring the other cover to be fixed to the other one of the handles.

8. A faucet safety device as claimed in claim 7, each locking mechanism including a pair of elongated, opposed, separable toothed surfaces that move lengthwise relative to one another as the cover is expanded and contracted, with the teeth of the surfaces being interlockable to prevent expansion of the cover.

9. A faucet safety device as claimed in claim 8, each of said covers presenting an outer cylindrical face and including a tab, said tab projecting from said outer face presenting an inside face positionable in an opposed relationship with said outer face, each of said toothed surfaces being defined on a respective one of the faces.

10. A faucet safety device as claimed in claim 8, each of said covers including an end wall, at one end of the cylindrical face, said end wall presenting an opening.

11. A faucet safety device as claimed in claim 7, resilient, compressible material being located in each cavity and being adapted to grippingly engage the handles and the covers.

12. A faucet safety device as claimed in claim 7, each of said covers including a first portion, a second portion, and a hinge pivotly connecting the first and the second portions.

* * * * *